United States Patent [19]

Sturm

[11] 4,122,381

[45] Oct. 24, 1978

[54] HOME POWER STATION

[76] Inventor: Zeynab Edda Sturm, P.O. Box 202, Vanderveer Station, Brooklyn, N.Y. 11210

[21] Appl. No.: 774,532

[22] Filed: Mar. 4, 1977

[51] Int. Cl.² .............................................. H02J 7/32
[52] U.S. Cl. ...................................... 320/48; 290/52; 320/61
[58] Field of Search ..................... 290/1, 2, 32, 54, 50; 320/2, 48, 61

[56] References Cited

U.S. PATENT DOCUMENTS 2,097,166  10/1937  Stone ........................................ 290/2
2,652,690   9/1953  Labriola et al. ......................... 290/1

OTHER PUBLICATIONS

Popular Science Art by E. F. Lindsley 'Water Power for your Home' from the May 1977 issue pp. 87–91.

Primary Examiner—Robert K. Schaefer
Assistant Examiner—John W. Redman
Attorney, Agent, or Firm—Robert W. Beach; Ward Brown

[57] ABSTRACT

A generator is driven by a miniature hydraulic turbine which, in turn, is driven by water flowing to, through or from the water system of a residential or commercial building. Electricity generated by the generator is stored in storage batteries for emergency or supplemental use. A distribution panel is operable to give a readout of the amount of stored electricity. The readout can be obtained by pushing a button on the distribution panel and such readout directly and immediately informs the reader of the number of hours a specific appliance can be operated by the stored electricity.

6 Claims, 3 Drawing Figures

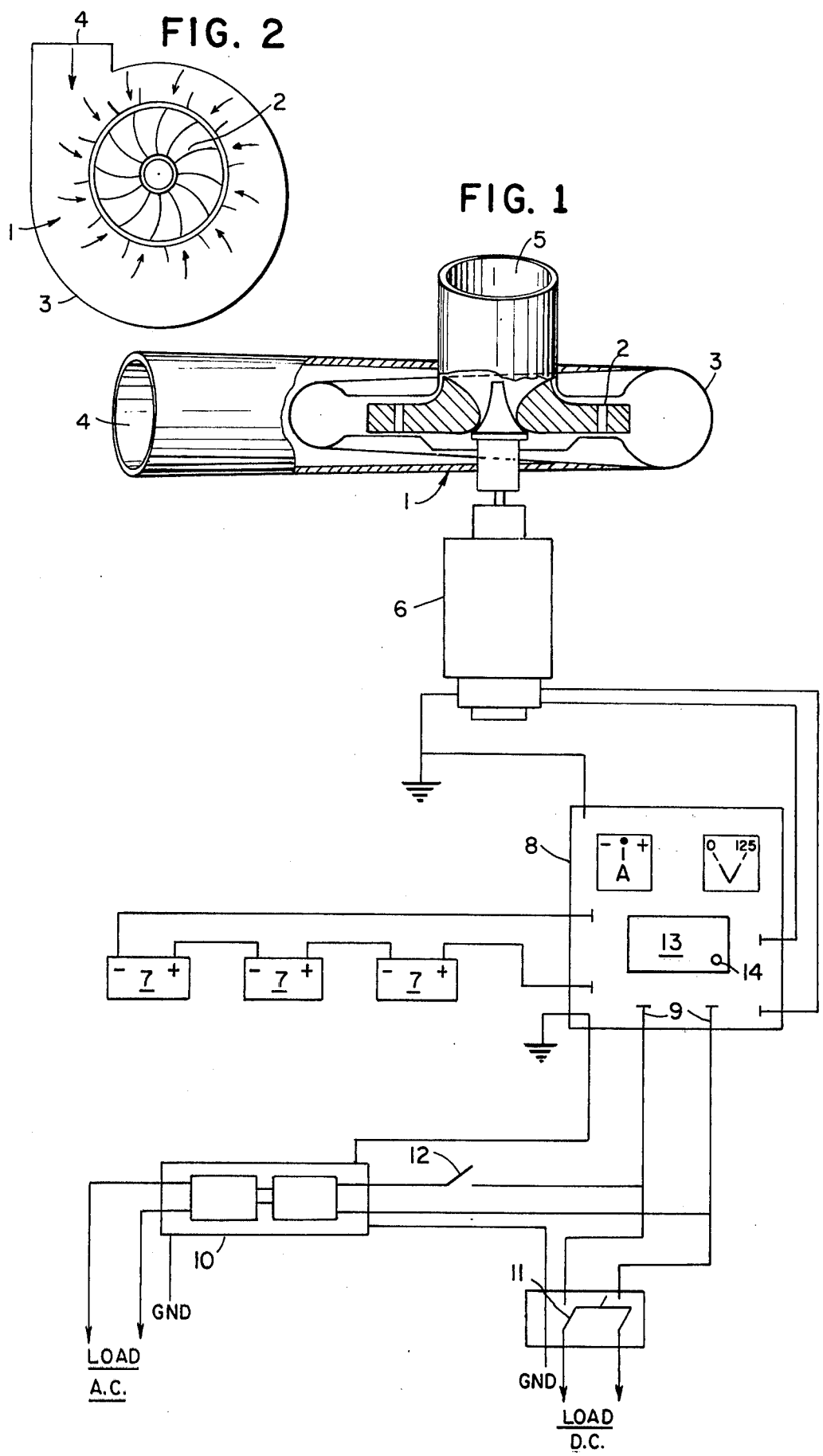

FIG. 3

AVAILABLE ENERGY CONVERSION TABLE INTO APPLIANCES OPERATING TIMES:

| KWH AVAILABLE: | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| APPLIANCES TO BE USED: | WATTS OR AMPS: | | | | | | | | | | | | | | | | | | | | | | | | | |
| MIXER | 425 | $2\frac{1}{4}$ | $4\frac{1}{2}$ | 7 | | | | | | | | | | | | | | | | | | | | | | |
| JUICER | 4.3 AMPS | | | | | | | | | | | | | | | | | | | | | | | | | |
| SALAD MAKER | 150 | $6\frac{2}{3}$ | $13\frac{1}{3}$ | | | | | | | | | | | | | | | | | | | | | | | |
| IRON | 1000 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| RADIO | 35 | 38 | | | | | | | | | | | | | | | | | | | | | | | | | |
| TOASTER | 750 | $1\frac{1}{4}$ | | | | | | | | | | | | | | | | | | | | | | | | | |
| HAIR DRYER | | | | | | | | | | | | | | | | | | | | | | | | | | | |
| HEATING PAD | 65 | 15 | | | | | | | | | | | | | | | | | | | | | | | | | |
| HEAT. BLANKET | 735 | $1\frac{1}{3}$ | | | | | | | | | | | | | | | | | | | | | | | | | |
| AIR CONDIT. | 830 | 1 | | | | | | | | | | | | | | | | | | | | | | | | | |
| WASH MACHINE | 9.8 AMPS | | | | | | | | | | | | | | | | | | | | | | | | | |
| FREEZER | | | | | | | | | | | | | | | | | | | | | | | | | | | |
| SABER SAW | 2.5 AMPS | | | | | | | | | | | | | | | | | | | | | | | | | |
| DRILL | 2.4 AMPS | | | | | | | | | | | | | | | | | | | | | | | | | |
| WAFFEL IORN | 660 | $1\frac{1}{2}$ | | | | | | | | | | | | | | | | | | | | | | | | | |
| HOT PLATE | | | | | | | | | | | | | | | | | | | | | | | | | | | |
| SHAVER | | | | | | | | | | | | | | | | | | | | | | | | | | | |
| FRIGIDAIR | | | | | | | | | | | | | | | | | | | | | | | | | | | |
| T.V. | | | | | | | | | | | | | | | | | | | | | | | | | | | |
| PHONE | | | | | | | | | | | | | | | | | | | | | | | | | | | |
| COFFEE MACH. | | | | | | | | | | | | | | | | | | | | | | | | | | | |
| EMERG LIGHT | | | | | | | | | | | | | | | | | | | | | | | | | | | |
| CAN OPENER | | | | | | | | | | | | | | | | | | | | | | | | | | | |
| ALARM | | | | | | | | | | | | | | | | | | | | | | | | | | | |
| DOOR OPEN | | | | | | | | | | | | | | | | | | | | | | | | | | | |
| ELECTR. LUNG | | | | | | | | | | | | | | | | | | | | | | | | | | | |
| CAUTERIZ | | | | | | | | | | | | | | | | | | | | | | | | | | | |
| SUCTION M. | | | | | | | | | | | | | | | | | | | | | | | | | | | |
| $O_2$ MACHINE | | | | | | | | | | | | | | | | | | | | | | | | | | | |
| KIDNEY MACH. | | | | | | | | | | | | | | | | | | | | | | | | | | | |
| PACE MAKER | | | | | | | | | | | | | | | | | | | | | | | | | | | |
| PRIM. BABY CRIP | | | | | | | | | | | | | | | | | | | | | | | | | | | |
| $H_2O$ PUMP | | | | | | | | | | | | | | | | | | | | | | | | | | | |
| VACUUM CL. | | | | | | | | | | | | | | | | | | | | | | | | | | | |
| RUG WASH MACH | | | | | | | | | | | | | | | | | | | | | | | | | | | |

HOME POWER STATION

BACKGROUND OF THE INVENTION

1. Field of the Invention

The present invention relates to a home power station for converting the power of water flowing to, through or from the water system of a residential or commercial building into electrical energy, and to storing such electrical energy for supplemental or emergency use.

2. Prior Art

At present, the vast majority of electricity users are dependent on a local power plant from which they purchase electricity. The problem with this system is that a user can control his electricity usage, and, consequently, his electricty bill, only to a limited extent because a certain amount of electricity usage has become a necessity. In addition, when the user's supply is cutoff, such as by a blackout, such user has no choice but to do without electricity because there is no alternative supply.

SUMMARY OF THE INVENTION

It is an object of the present invention to provide a source of electricity for individual electricity users other than a local power plant.

It is also an object to provide such source in a form which will convert a common, untapped source of energy into electricity.

A further object is to store energy generated by such source for supplemental or emergency use. In accordance with this object, an additional object is to provide mechanism enabling a user to discover how much energy has been stored so that such user can ration the stored electricity in accordance with his own priorities without exhausting the stored electricity.

The foregoing objects can be accomplished by providing a generator driven by a miniature hydraulic turbine which, in turn, is driven by water flowing to, through or from the water system of the user's residential or commercial building. Mechanism is provided to store the electricity generated and a distribution panel is operable to give a readout of the amount of electricity stored. In the preferred embodiment of the invention, the readout can be obtained by pushing a button on the distribution panel and such readout directly and immediately informs the user of the number of hours a specific appliance can be operated by the stored electricity.

BRIEF DESCRIPTION OF THE DRAWINGS

FIG. 1 is a diagram of a home power station in accordance with the present invention, including a diagrammatic axial section of a turbine and a diagrammatic circuit diagram showing the other elements of such station and their connections.

FIG. 2 is a diagrammatic top plan of the turbine shown in FIG. 1.

FIG. 3 shows a representative available energy conversion table of the distribution panel of the home power station of FIG. 1.

DETAILED DESCRIPTION

In the preferred embodiment of the invention shown in FIG. 1, a miniature hydraulic turbine 1 includes a vaned rotor 2 mounted in a volute 3. Such volute includes an inlet 4 for directing water generally tangentially toward the rotor and an outlet 5 for conducting water generally axially away from the rotor. The turbine can be connected to the water system of a residential or commercial building such that water from such system flows into the volute inlet and out of the volute outlet to continue its travel through the system. The turbine could be connected at the point of entry of water into the water system, or at the point of discharge of water from the water system, or at any point in between.

As water flows through the building water system, turbine 1 drives a generator 6 and the electrical output of such generator charges batteries 7 through appropriate circuitry of a distribution panel 8. It is preferred that the generator be of the compound winding type.

Batteries 7 supply DC power to the outlet 9 of the distribution panel. As diagrammatically illustrated at the bottom of FIG. 1, such outlet may be connected directly to a DC load or may be connected through an inverter 10 to an AC load. Switches 11 and 12 control the supply of power to the DC load and AC load, respectively. It is intended that the AC load terminals of inverter 10 be connected directly to the building wiring, so that in the case of a blackout batteries 7 could supply power to the building wiring system. Switch 12 could be designed to connect the output of the distribution panel to the building wiring automatically when the power from the local power plant is cutoff, and automatically disconnect the distribution panel outlet from the building wiring when power supply from the power plant resumes. Optionally, whenever the batteries had been charged sufficiently by the generator, the connection of the building to the local power plant could be broken and power could be supplied by the batteries. Thus, the batteries constitute mechanism for storing electricity generated by generator 6 for emergency or supplemental use. Any other electricity-storing mechanism could be used.

It is desirable that a user of a home power station in accordance with the present invention be able to quickly and easily determine the amount of electricity which has been stored in batteries 7. For this purpose, distribution panel 8 includes an available energy conversion table 13. Such table includes a button 14 which when pushed effects a readout of the amount of electricity stored in the batteries. By pushing button 14, one number of a row of numbers 15 is illuminated to indicate the number of kilowatt hours available. The table has a similar row of numbers for each of several specific appliances and pushing of button 14 activates illumination of the appropriate number in such row to indicate the approximate number of hours the appliance may be operated without exhausting the electricity stored in the batteries. The rows of numbers are arranged such that a straight column of numbers is illuminated each time button 14 is pushed, such column being formed by one number from each row. The uppermost number in such illuminated column indicates the number of kilowatt hours available, the next lower number indicates the approximate number of hours a specific appliance such as a mixer may be operated, the next lower number indicates the approximate number of hours a different appliance such as a juicer may be operated, and so on. A representative but incomplete available energy conversion table is shown in FIG. 3.

I claim:

1. A home power station comprising:
   means for generating electricity;
   means connected to said generating means for storing
      electricity generated by said generating means;

means for connecting said storing means to a load; and means for indicating the amount of electricity stored in said storing means, said indicating means including an available energy conversion table having numbers and activating means for making one of said numbers more visible than another of said numbers, such more visible number corresponding to the amount of electricity stored in said storing means.

2. The home power station defined in claim 1, in which the activating means includes means for activating illumination of one of the numbers of the energy available conversion table, such illuminated number corresponding to the amount of electricity stored in the storing means.

3. The home power station defined in claim 1, in which the available energy conversion table has a row of numbers and the activating means includes means for illuminating one of said numbers in said row, such illuminated number corresponding to the amount of electricity stored in the storing means.

4. The home power station defined in claim 3, in which the available energy conversion table has several rows of numbers and the activating means activates illumination of a number in each of such rows, each of such illuminated numbers corresponding to the amount of electricity stored in the storing means.

5. The home power station defined in claim 4, in which the illuminated number in at least one of the rows of the available energy conversion table corresponds to the time a specific appliance may be used without exhausting the electricity stored in the storing means.

6. The home power station defined in claim 3, in which the activating means includes a push button.

* * * * *